United States Patent [19]
Moorhead et al.

[11] 3,820,188
[45] June 28, 1974

[54] WINDSHIELD WIPER BLADE STRUCTURE

[75] Inventors: John P. Moorhead, Palos Verdes, Calif.; Donald W. Stratton, Hammond, Ind.

[73] Assignee: The Anderson Company, Gary, Ind.

[22] Filed: Feb. 1, 1973

[21] Appl. No.: 328,649

[52] U.S. Cl. ............................................. 15/250.42
[51] Int. Cl. ............................ B60s 1/04, B60s 1/38
[58] Field of Search ...................... 15/250.36, 250.42

[56] References Cited
UNITED STATES PATENTS

| | | | |
|---|---|---|---|
| 3,107,384 | 10/1963 | Wise | 15/250.42 |
| 3,121,903 | 2/1964 | Ludwig | 15/250.42 |
| 3,408,680 | 11/1968 | Heller | 15/250.42 |
| 3,667,083 | 6/1972 | Linker | 15/250.42 |

FOREIGN PATENTS OR APPLICATIONS 1,322,277  7/1973  Great Britain

Primary Examiner—Peter Feldman
Attorney, Agent, or Firm—Hofgren, Wegner, Allen, Stellman & McCord

[57] ABSTRACT

A windshield wiper assembly for a curved windshield, including a pressure distributing superstructure having claws adapted to engage a blade structure at longitudinally spaced positions, together with a blade structure including a flexible holder having a pair of laterally opening slots for receiving the claws of the superstructure, and a longitudinal retention chamber receiving an enlarged retention bead along the upper edge of a resilient wiping element.

17 Claims, 8 Drawing Figures

PATENTED JUN 28 1974 3,820,188
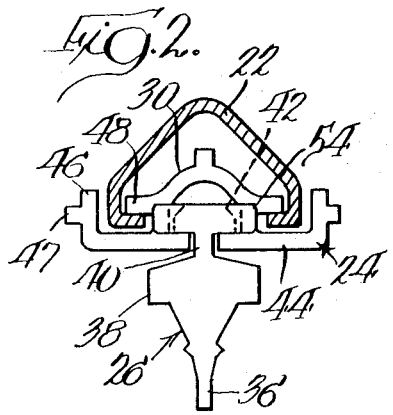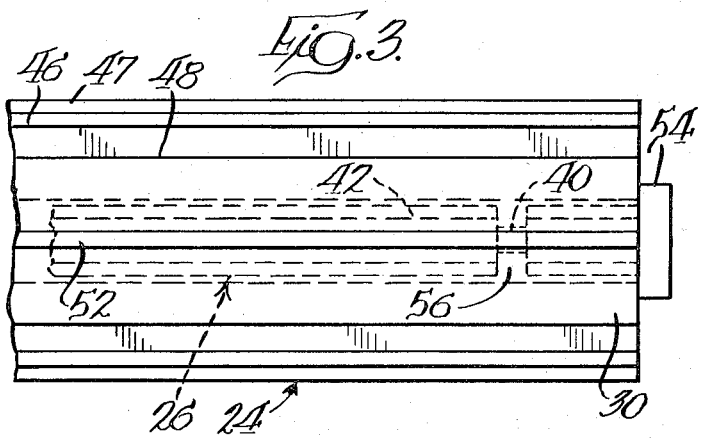
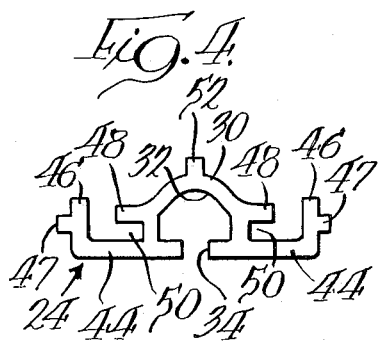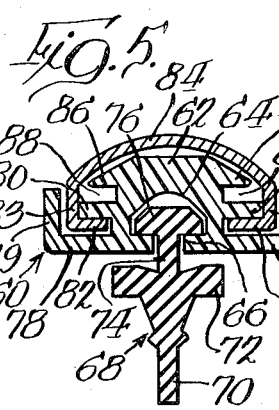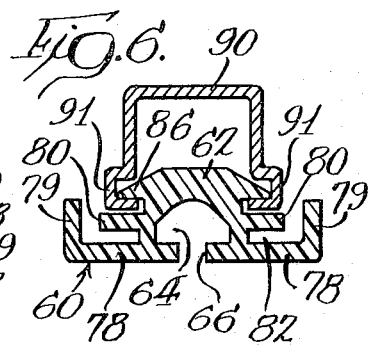
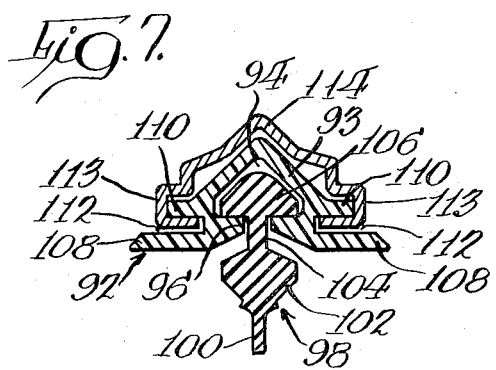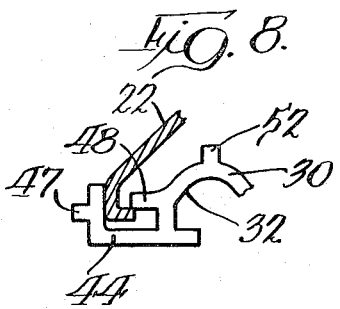

WINDSHIELD WIPER BLADE STRUCTURE

BACKGROUND OF THE INVENTION

The present invention relates primarily to a flexible backing member or holder, sometimes called a flexor, for backing a resilient wiping element in a windshield wiper apparatus.

In the past, the resilient wiper blade has often been backed by a metal backing member, though sometimes backing members have been made of plastic material, as shown for example in U.S. Pat. Nos. 2,706,305 and 3,629,898. In either event, the backing member and wiping element are usually supported in a superstructure by means of a plurality of longitudinally spaced claws on the superstructure adapted to engage the edges of the backing member. The superstructure, backing member and wiping element comprise the wiper assembly and is supported for movement on a wiper arm. The claws engage the backing member at lateral edges and while there is movement of the backing member longitudinally relative to the claws, the latter usually engage some abutting means for preventing disconnection of the backing member from the claws. In order to limit the backing member against longitudinal movement relative to the superstructure, notches or abutments have been provided along lateral edges of the backing member adapted to be releasably engaged by the claws. While the interconnections described above have operated reliably in most instances, it will be appreciated that the claws usually straddle the backing member, and in order to fit properly, the lateral spacing of the claws must be appropriate to fit the lateral width of the backing member, and the longitudinal spacing of the claws must be appropriate to fit the longitudinal spacing of interlocking notches or abutments in the backing member. As a result of manufacturing tolerances and differences in manufacturers' designs, it is sometimes difficult to interfit one with the other. Thus, a replaceable blade structure from one manufacturer may not always fit a superstructure of another manufacturer.

It would be desirable to provide a universal blade structure which could be utilized as a replacement adapted for use with various superstructures.

SUMMARY OF THE INVENTION

It is an important object of the present invention to provide a universal blade structure including a universal backing member having a construction adapted to fit various superstructures of different configuration.

A more specific object is to provide an elongate backing member of flexible material adapted to be attached to a superstructure for holding a resilient wiping element, including a receiver having a longitudinal chamber for a retention bead on a wiping element, a relatively narrow slot opening into the chamber along the bottom of the receiver, a pair of opposed lower flanges extending laterally outwardly on the receiver in opposite directions from the slot, and a pair of opposed upper flanges extending laterally outwardly in opposite directions on the receiver respectively in spaced relation above the lower flanges to define laterally opening slots for receiving the claws of a superstructure.

Preferably, the backing member includes a pair of upwardly directed flanges respectively extending along the outer edge of each of the lower horizontal flanges in spaced relation outwardly from the edges of the upper horizontal flanges.

In one construction illustrated herein, the longitudinal chamber in the tubular receiver has a cross section of generally triangular configuration.

In an alternative embodiment, the receiver is constructed with an additional pair of opposed laterally outwardly extending flanges of narrow width to define additional laterally opening slots for receiving the claws of a relatively narrow superstructure.

Another object of the invention is to provide a blade structure including a backing member of the character described, together with a resilient wiping element having a wiping edge, a relatively thin neck portion disposed in the slot of the backing member, and an enlarged retention bead along the upper edge of the wiping element disposed in the longitudinal chamber of the backing member.

A more comprehensive object of the invention is to provide a windshield wiper assembly for a curved windshield, including a pressure distributing superstructure having claws engaging laterally opening slots in the blade structure described.

BRIEF DESCRIPTION OF THE DRAWINGS

FIG. 1 is a side elevational view of a windshield wiper apparatus embodying the principles of the present invention;

FIG. 2 is an end elevational view of the apparatus shown in FIG. 1, with the claws of one end of one yoke of the superstructure shown in cross section;

FIG. 3 is a fragmentary top plan view of the blade structure shown in FIGS. 1 and 2, including backing member and wiping element, with the claw structure omitted;

FIG. 4 is an end elevational view of the backing member illustrated in FIGS. 1, 2 and 3, with the wiping element and the superstructure omitted;

FIG. 5 is a cross-sectional view through an alternative construction of the backing member, including a wiping element and one pair of claws at one end of a yoke of the superstructure;

FIG. 6 is a cross-sectional view through a backing member as illustrated in FIG. 5, showing a pair of claws of a different design of superstructure;

FIG. 7 is a cross-sectional view through a modified backing member including a wiping element and a pair of claws on a yoke of a superstructure; and FIG. 8 is a partial end elevational view of the apparatus shown in FIG. 1, with the claws of one end of one yoke of the superstructure shown in cross-section and in a different position than in FIG. 2.

DETAILED DESCRIPTION OF PREFERRED EMBODIMENTS

Referring now to the drawings in more detail, a superstructure 10 includes a primary yoke member or bridge member 12 having a central portion constructed as at 14 for appropriate attachment to a spring-pressed wiper arm, not shown, and which forms no part of the present invention. Opposite ends of the primary yoke member 12 are attached to mid portions of secondary yokes 16 and 18. The superstructure including the primary yoke 12 and the secondary yokes 16 and 18 may correspond in general with the construction illustrated in prior U.S. Pat. No. 2,897,530 to John W. Anderson. Preferably, at least one of the secondary yokes, 18 as shwon herein, is releasably attached to the primary yoke 12, and may be readily detached upon depression of a release button illustrated at 20. Opposite ends of the secondary yokes 16 and 18 are formed with claws as at 22 engaging an edge of a backing member 24 carrying a wiping element 26. Outboard ends of the secondary yokes 16 and 18 include downwardly turned end portions 28 for limiting longitudinal movement of the backing member 24 relative to the superstructure, thereby to retain the blade structure on the superstructure.

A wiper of the type illustrated is adapted for cleaning curved and flat windshields on moving vehicles such as automobiles, airplanes and the like. The superstructure, including pressure-distributing yokes 12, 16 and 18, transmits pressure from a spring-pressed wiper arm to the flexible backing member 24 and wiping element 26. As a result of the pressure distributed through the yokes, the backing member tends to conform to the general curvature of the windshield. As the wiper assembly is moved back and forth over the windshield, the wiping element conforms to the constantly changing contours of the windshield.

The backing member 24 is preferably of extruded flexible plastic material such as glass reinforced polycarbonate, and includes a central tubular portion 30 having a chamber 32 which functions as a receiver for a retaining bead on the wiping element 26. The chamber 32 is somewhat triangular in cross-sectional configuration and a relatively narrow slot 34 opens into the chamber along the bottom of the tubular portion 30. The wiping element 26 is preferably made of relatively soft resilient rubber-like material and includes a relatively thin wiping edge 36, a thicker intermediate portion 38, a relatively thin neck portion 40 and an enlarged retention bead 42 along the upper edge. In use of the invention, the wiping element 26 is attached to the backing member 24 with the retention bead 42 of the wiping element disposed in the receiver chamber 32, and with the relatively thin neck portion 40 of the wiping element disposed in the receiver slot 34. As illustrated, the retention bead 42 has a generally triangular cross section which is complementary to the receiver chamber 32. The wiping element 26 is attached to the backing member 24 by threading the bead 42 into the receiver chamber 32 as will be described hereinafter.

As best understood on reference to FIGS. 2 and 4, the backing member 24 is relatively wide and relatively thin, and includes a pair of opposed rails or flanges 44 extending laterally outwardly in opposite directions from the slot 34 at the bottom of the receiver 30. Preferably, each of the elements 44 is formed along the outside edge with an upwardly directed flange 46 which functions to reinforce or strengthen the flange 44 along the outer edge so as to add resistance to flexing of the backing member 24 in a plane perpendicular to the windshield. As illustrated, each of the flanges 46 includes an outwardly directed rib 47 which is located on the vertical center of gravity of the flexor. Due to the location of the ribs 47 stiffness is added to the flexor or backing member in the plane parallel to the windshield but they do not add stiffness in the plane perpendicular to the windshield. Above the flanges 44, the receiver 30 is formed with outwardly directed flanges 48 which are spaced vertically from the flanges 44 and spaced laterally from the flanges 46 in a manner to form openings 49 between flanges 46 and the edges of flanges 48 and forms slots 50 between flanges 48 and 44 for receiving the claws 22 of the secondary yokes 16 and 18. The upwardly disposed flanges 46 also serve to confine the claws in the slots or grooves 50 by limiting the outward movement of the claws relative to the flanges 48. As illustrated, the top of the tubular receiver 30 is formed with a longitudinal reinforcing rib 52 which limits the capacity of the tubular portion to collapse against the retention rib 42 of the flexible wiping member. The rib 52 extends vertically upward in such a way as to serve as an aid in retention of the flexor 24 in the superstructure 10 by engaging the downwardly turned end portions 28 of the yokes 16 and 18. The openings 49 between the edges of the flanges 48 and the inner walls of the upward flanges 46 are computed to be of a size that all known popular style claws will fit into the openings 49 with their inturned ends in the slots 50 so that the minimum size and maximum size claws will either nest up relative close to the edges of the flanges 48 or the outside edges of the claws will engage the insides of the flanges 46, see FIG. 8, respectively. In any set of conditions the claws will not disengage from the flanges 48.

In assembly of the apparatus as illustrated in FIG. 1, the backing member 24 with attached wiping element 26 is attachable to the secondary yokes 16 and 18 by insertion of the claws 22 of yokes 16, 18 into the slots 50 at the end of the backing member. The claws fit loosely enough in the slots 50 so that the backing member is slidable relative to the claws to longitudinally position the backing member properly relative to the superstructure. When the backing member and the wiping element are positioned as illustrated in FIG. 1, the rib 52 project upwardly from the backing member and engage with the downwardly directed end portions 28 on the ends of the yokes 16 and 18 to limit longitudinal movement of the backing member relative to the secondary yokes and prevent removal of the backing member and wiping element from the superstructure. Assembly of the apparatus is facilitated by disconnecting the secondary yoke 18 from the end of the primary yoke 12, so that the secondary yoke 16 may be assembled on the backing member from the left end as viewed in FIG. 1, and the secondary yoke 18 may be assembled on the backing member from the right end as viewed in FIG. 1, after which the secondary yoke 18 is again attached to the end of the primary yoke 12.

The wiping element 26 is assembled relative to the backing member 24 by sliding the retention bead 42 into the end of the receiver chamber 32, while the relatively thin neck portion 40 of the wiping member is inserted into the slot 34 in the bottom of the receiver. Preferably, some suitable means is utilized for releasably retaining the wiping member against substantial longitudinal movement relative to the backing member so that the parts do not become disassembled unintentionally. As illustrated herein, the retention bead 42 of the wiping element 26 is formed at opposite ends with an enlarged abutment or stop portion 54 adapted to engage the end of the receiver 30. By virtue of the abutment 54 at each end of the wiping element, the wiping element is retained against significant unintentional longitudinal displacement relative to the backing member.

In order to facilitate insertion of the wiping element into the backing member despite the abutments 54 at opposite ends, the retention bead 42 is omitted for a short length adjacent one or both ends to form a gap as illustrated at 56. In assembly, the end portion of the wiping element adjacent the stop 54 illustrated in FIG. 3 is bent downwardly to expose the end of the retention bead 42 at the left edge of the gap 56, so that the bead may be inserted in the left end of the receiver chamber 32 and moved toward the right to the position illustrated in FIG. 3. At this time, the right end portion of the wiper member 26 may be resiliently stretched to insert the remaining end portion of the bead 42, at the right of gap 56, into the right end of the receiver chamber 32. Now, when the stretched wiping element is released, it retracts to the position shown in FIG. 3. The wiping element may be removed from the backing member by reversing the procedure.

In use of the backing member as described above, it will be understood that so long as the width of the claws 22 is accommodated in the claw receiving slots 50, the backing member may be used with a variety of superstructures where the claws vary in number and vary in longitudinal positions, because the continuity of the claw receiving slots does not restrict the number or location of the claws.

In order to accommodate superstructures in which the face-to-face spacing of each pair of claw constructions is substantially narrower, the backing member may be constructed in an alternative form as illustrated in FIGS. 5 and 6 wherein one pair of claw slots is provided for relatively widely spaced claws and another pair of claw slots is provided for relatively closely spaced claws. Referring to FIGS. 5 and 6, a backing member 60 includes a central tubular portion 62 with a receiver chamber 64 and a slot 66 opening into the chamber 64 along the bottom of the receiver. A wiping element 68 includes a relatively thin wiping edge 70, a relatively thick intermediate portion 72, a relatively thin neck portion 74 positionable in the slot 66, and an enlarged retention bead as at 76 positionable in the receiver chamber 64.

In order to provide for retention of the backing member 60 on superstructures with claws of varying face-to-face width, the backing member includes a pair of outwardly extending flanges 78 adjacent the slot 66, and a pair of additional flanges 80 spaced above the flanges 78 to form claw receiving slots 82 which accept relatively widely spaced claws 83 on the ends of a yoke 84. Above the flanges 80, the receiver 62 is formed with still another pair of outwardly directed flanges 86 which are narrower than the flanges 80 and provide additional claw receiving slots 88 for receiving the claws 91 of a narrower yoke 90 illustrated in FIG. 6. Preferably, each of the laterally outwardly extending flanges 78 includes at the outer edge an upwardly directed reinforcing flange 79. With this construction, it is possible to releasably attach the backing member 60 to yoke 84 with relatively widely spaced claws 83 as illustrated in FIG. 5, or with claws 91 which are more closely spaced as associated with yoke 90 as illustrated in FIG. 6.

In the embodiment of FIG. 7, a backing member 92 includes a central portion 93 of generally triangular cross-sectional configuration including a central longitudinal receiver chamber 94 and a slot 96 opening into the chamber 94 along the bottom of the receiver. A wiping element 98 includes a relatively thin wiping edge 100, a relatively thick intermediate portion 102, a relatively thin neck portion 104 positionable in the slot 96, and an enlarged retention bead 106 along the upper edge positionable in the receiver chamber 94. Flanges 108 extend laterally outwardly in opposite directions at the bottom of the receiver at opposite sides of the slot 96, and upwardly spaced outwardly extending flanges 110 provide spaces forming slots 112 between flanges 108 and 110 for receiving the claws 113 of yoke 114 as illustrated and having a cross-sectional configuration conforming closely to the triangular configuration of the central receiver portion 93. In the construction of FIG. 7, like that in FIG. 5, the central portion 93 of the backing member closely conforms in shape to the retention bead 106 of the wiping element 98, and the end portions of the yokes 114 closely conforms to the central portion 93 of the backing member 92 in a very compact arrangement.

We claim:

1. An elongate backing member adapted to be attached to a superstructure for holding a flexible windshield wiping element, comprising,
    a. a tubular receiver having a longitudinal chamber for holding a retention bead on said wiping element,
    b. the bottom of the receiver having a relatively narrow longitudinal slot opening into the chamber,
    c. a pair of opposed flanges extending laterally outwardly in opposite directions from the bottom of the receiver, and
    d. a second pair of opposed flanges extending laterally outwardly in opposite directions on the receiver in vertically spaced relation above said first flanges to define laterally opening slots for receiving the claws of a superstructure.

2. An elongate backing member as defined in claim 1, including a third pair of opposed flanges extending laterally outwardly in opposite directions on the receiver in vertically spaced relation above the second pair of flanges and having outer edges of narrower width than the outer edges of said second pair of flanges to define laterally opening slots for receiving the claws of a relatively narrow superstructure.

3. An elongate backing member as defined in claim 1, including a pair of upwardly directed flanges, each one connected to the outer edge of one of said first-named flanges and providing an opening between the upwardly directed flanges and the outer edge of one of said second flanges.

4. An elongate backing member as defined in claim 1, wherein the longitudinal chamber in the tubular receiver has a cross section of generally enlarged configuration.

5. An elongate support member of flexible plastic material adapted to be attached to a superstructure for holding a resilient windshield wiping element, comprising,
    a. a tubular receptor having a longitudinal chamber and a relatively narrow slot opening into the chamber along the bottom of the receptor,
    b. a pair of opposed lower flanges extending laterally outwardly on the receptor in opposite directions from the bottom of the receptor,
    c. a pair of upper opposed flanges extending laterally outwardly in opposite directions on the receptor respectively in spaced relation from the lower flanges to define laterally opening slots, and d. a pair of upwardly directed flanges respectively extending along the outer edge of each of said lower flanges in spaced relation outwardly from the edges of said upper flanges, e. said laterally extending flanges permitting flexibility in a plane perpendicular to a plane containing said lower flanges and limiting flexibility in said plane containing said lower flanges.

6. An elongate support member as defined in claim 5, wherein the longitudinal chamber in the tubular receptor has a cross section of generally enlarged configuration.

7. An elongate support member as defined in claim 5, wherein each of said upwardly directed flanges includes a longitudinally extending outwardly directed reinforcing rib.

8. An elongate blade structure adapted for use in a windshield wiper assembly for a windshield, comprising, a. a flexible tubular holder having a longitudinal chamber and a relatively narrow slot opening into the chamber along the bottom of the holder, b. a pair of opposed lower flanges extending laterally outwardly on the holder in opposite directions from the bottom of the holder, c. a pair of opposed upper flanges extending laterally outwardly in opposite directions on the holder respectively in spaced relation above the lower flanges to define laterally opening slots for receiving the claws of a superstructure, and d. a resilient wiping element having a wiping edge, a relatively thin neck portion disposed in said slot, and an enlarged retention bead along the upper edge disposed in said chamber.

9. An elongate blade structure as defined in claim 8, wherein the chamber and retention bead have generally complementary cross sections of generally triangular configuration.

10. An elongate blade structure as defined in claim 8, including a pair of upwardly directed flanges respectively extending along the outer edge of each of said lower flanges in spaced relation outwardly from the edges of said upper flanges.

11. An elongate blade structure adapted for use in a windshield wiper assembly for a windshield, comprising a resilient wiping element having a wiping portion, a neck portion and a retention portion, said neck portion being of narrower lateral width than the wiping and retention portions and connecting them together, and an integral support member relatively flexible in a plane generally perpendicular to the surface of the windshield to be wiped and relatively inflexible in a plane parallel to said surface, said support member comprising a pair of longitudinally elongated planar means spaced apart to define a central opening, a tubular receptor integrally joined to said planar means proximate the inner edges thereof, said receptor having a maximum lateral width greater than the width of said central opening and being adapted to retain the retention portion of said wiping element, each of said planar means having an upwardly extending flange integrally joined to the outer edge thereof, said tubular receptor having on the sides thereof horizontally extending flanges spaced above said planar means and having outer edges spaced horizontally from said upwardly extending flanges, said outer edges of said horizontal flanges being adapted to be engaged by claws of a superstructure.

12. A blade element adapted for use in a windshield wiper assembly comprising a pressure distributing superstructure adapted to apply downward pressure to the blade element at spaced locations positioned at the ends and at at least one intermediate point on the blade element, said superstructure having claws adapted to engage the blade element at said spaced locations, said blade element comprising a resilient wiping element having a wiping portion, a neck portion, and a retention portion, said neck portion being of narrower lateral width than the wiping and retention portions and connecting them together, an integral support member relatively flexible in a plane generally perpendicular to the surface of the windshield to be wiped and relatively inflexible in a plane parallel to said surface, said support member having a constant cross-sectional shape over the longitudinal extent thereof, said cross-sectional shape having a U-shaped lower portion with a central opening and an upper hollow conduit portion having an opening at the bottom thereof, said openings being in communication with each other, the upwardly extending portions of said U-shaped lower portion being relatively narrow with respect to the base portion, said upper portion having at the sides thereof means for engaging said claws and means for maintaining said resilient wiping member and said integral support member in assembled relation.

13. A windshield wiper assembly for a curved windshield, comprising a pressure distributing superstructure having claws adapted to engage a blade element at spaced locations to apply downward pressure to the blade element at the ends and at intermediate points on the blade element, said blade element comprising a resilient wiping element having a wiping portion, a relatively narrow neck portion and a relatively thick retention portion, and an integral support member relatively flexible in a plane generally perpendicular to the surface of the windshield to be wiped and relatively inflexible in a plane parallel to said surface, said support member comprising a pair of longitudinally elongated planar means spaced apart to define a central opening, a tubular receptor integrally joined to said planar means proximate the inner edges thereof, said receptor having a maximum lateral width greater than the width of said central opening and being adapted to retain the retention portion of said wiping element, said tubular receptor having on the sides thereof horizontally extending flanges spaced above said planar means and adapted to be engaged by the claws of said superstructure, and means adapted to maintain said wiping element and the integral support member in assembled relation.

14. A windshield wiper assembly for a windshield, comprising, a. a pressure distributing superstructure having claws adapted to engage a blade structure at longitudinally spaced positions, b. a flexible tubular holder having a longitudinal chamber and a relatively narrow slot opening into the chamber along the bottom of the holder, c. a pair of opposed lower flanges extending laterally outwardly on the holder in opposite directions from the bottom of said holder, d. a pair of opposed upper flanges extending laterally outwardly in opposite directions on the holder respectively in spaced relation above the lower flanges to define laterally opening slots for receiving the claws of said superstructure,
e. a resilient wiping element having a wiping edge, a relatively thin neck portion disposed in said slot, and an enlarged retention bead along the upper edge disposed in said chamber, and
f. said laterally extending flanges maintaining the receptor relatively inflexible in a plane parallel to such flanges, while permitting flexibility transverse to such plane.

15. A windshield wiper assembly as defined in claim 14, including a pair of upwardly directed flanges respectively extending along the outer edge of each of said lower flanges in spaced relation outwardly from the edges of said upper flanges.

16. A windshield wiper assembly as defined in claim 15, wherein each of said upwardly directed flanges includes a longitudinally extending outwardly directed reinforcing rib.

17. A windshield wiper assembly as defined in claim 14, wherein a third pair of flanges extend laterally from said receptor in vertically spaced relation with said upper flanges to define a second outwardly opening pair of slots to receive a different sized pair of claws of a superstructure.

* * * * *